Figure 1:
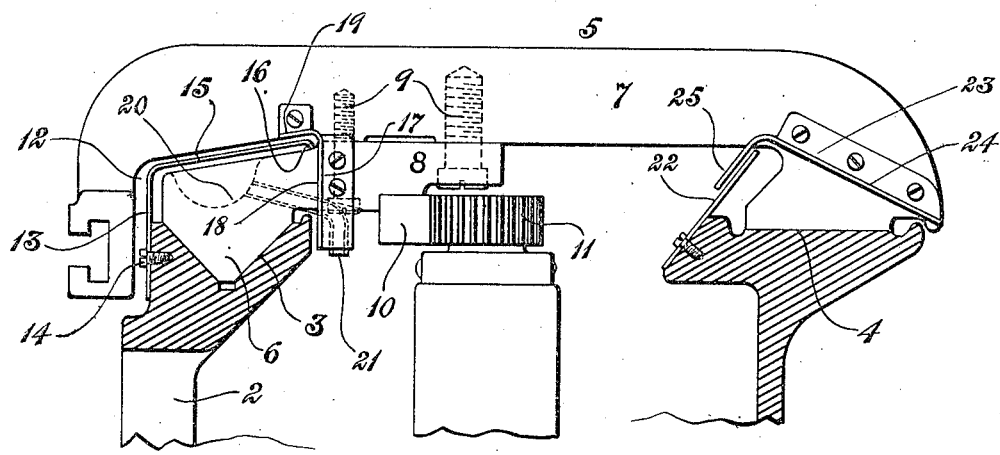

B. M. W. HANSON.
BEARING GUARD.
APPLICATION FILED MAY 11, 1908.

909,893.  Patented Jan. 19, 1909.

WITNESSES:

INVENTOR.
B. M. W. Hanson
BY Sutherland & Anderson
ATTORNEYS.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

BEARING-GUARD.

No. 909,893.     Specification of Letters Patent.     Patented Jan. 19, 1909.

Application filed May 11, 1908. Serial No. 432,095.

*To all whom it may concern:*

Be it known that I, BENGT M. W. HANSON, a citizen of the United States, residing at Hartford, in the county of Hartford and State of Connecticut, have invented certain new and useful Improvements in Bearing-Guards, of which the following is a specification.

This invention relates to bearing-guards, the object of the invention being to provide a device of this character which is simple in construction and which effectually protects bearings from the deleterious action of foreign substances of various kinds.

The device can be employed with advantage in many different connections although it is of particular utility when used in conjunction with the slide and bed or equivalent parts of a metal-working machine.

In the drawings accompanying and forming part of this specification I have represented in detail one form of embodiment of the invention which to enable those skilled in the art to practice the same will be set forth at length in the following description while the novelty of the invention will be included in the claims succeeding said description. In said drawings I have represented a bed and slide of a metal-working machine which may be such a one as is utilized for reducing the diameter of metal stock.

Figure 2:
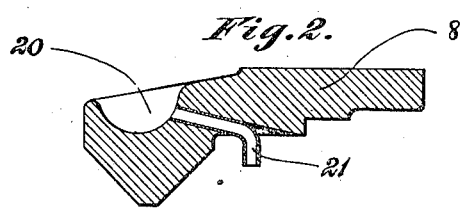

Referring to said drawings, Figure 1 is a sectional end elevation of the bed and slide of a metal-working machine, and Fig. 2 is a detail view in section of one of the sections of said slide.

Like characters refer to like parts in both figures of the drawings.

In Fig. 1 I have shown the bed of a machine of the class to which allusion has been made, the same being denoted by 2 and having two bearings or ways as 3 and 4 for a slide such as that denoted in a general way by 5. The bearing or way 3 is of substantially channel form being shown as of V-shape to receive the correspondingly-formed tongue 6 depending from said slide. The bearing 4 is horizontal or flat and it sustains for traveling movement a like surface on the under side of the slide 5, the latter in the present instance reciprocating upon two bearings or ways laterally separated from each other.

The slide 5 is shown as being of compound construction, comprising a main section as 7 and an auxiliary section as 8. I employ these terms simply for convenience of description as the auxiliary section 8 except as to size is in no sense subordinate to the main section. There are advantages following the sectional organization of the slide 5 as will hereinafter be made apparent. The two sections of the slide may be rigidly united together in any desirable manner for example by means of a screw or screws as 9, the fastening means in question connecting the auxiliary section 8 with the main section 7 on the under side of the latter.

A rack-bar 10 is shown as rigid with the auxiliary section 8, the teeth of said rack-bar meshing with a pinion as 11 rotatively supported upon the bed 2 and by turning which the slide 5 can be moved back and forth upon said bed 2, the means mentioned being a familiar one for operating slides. It might be stated that the V-shaped part to which reference has been made is formed upon said auxiliary section 8 while the bearing face which travels upon the bearing area 4 is formed upon the main section 7.

The two sections 7 and 8 of the slide are separated so as to produce a channel 12 one wall of which is on one of said sections while the other wall of which is on the other of said sections and this channel receives a portion of a guard-plate as 13 which serves in part as a protecting means for the bearing 3. The substantially upright or vertical body of said guard-plate 13 is represented as fastened to the bed 2 and for this purpose a screw or screws as 14 may be provided. The guard-plate 13 is furnished with an angular flange as 15 which extends into the similarly disposed channel 12 the free end of said flange having a downturned lip or bead as 16 contiguous to the bottom of the channel near the inner end thereof. Said guard-plate covers a relatively-considerable area and prevents the passage of flying particles into the bearing 3; it practically precludes also the movement of liquid, such as water and oil used in grinding and lubricating, respectively, into the inner end of the channel 12. Should any such liquid or even solid matter enter such channel by way of the inner end thereof I so dispose of the same as to prevent its flow into or upon the bearing 3, as will hereinafter appear.
Coöperative with the guard-plate 13 is a guard-member as 17 rigidly united to the slide 5 by being fastened for instance by screws, to the auxiliary section 8 thereof. This guard-member 17 is provided with a vertical flange as 18 and a crown or head flange as 19, the two flanges merging into each other to provide in effect a continuous flange and the flange 19 being angularly disposed and overhanging the inner portion of the flange 15. Should any foreign matter be directed against the flange 18 it will pass down the outside of the same without getting at the bearing 3 while should any of such matter fall upon the inclined flange 19 it will pass from the latter onto the inclined flange 15 and travel down the latter to the body of the guard-plate 13 which will dispose of it without possibility of its entrance to the bearing 3. The bearing 3 is therefore thoroughly protected. It is conceivable that clear water or oil might pass between the lip or bead 16 and the bottom of the channel 12 and I provide a means whereby such water or other liquid cannot obtain access to the bearing 3.

In the upper side of the auxiliary section 8 I have shown a trough or gutter as 20 closed at its opposite ends and from the said trough or gutter between its top and bottom a discharge duct as 21 leads. Said duct may consist of a tube somewhat bent and passing through a properly-formed opening in said section 8. Should any liquid pass under the lip 16 it will flow down the inclined upper side of the auxiliary section 8 which upper side is the bottom of the channel and from thence into the trough or gutter 20, escaping from the latter into the duct 21 which leads such liquid away from the bearing 3. It is therefore impossible for either liquid or solid matter to reach said bearing 3. The bearing 4 is also adequately protected and for this purpose a pair of guard members may be effectively utilized, one of said guard members consisting in the present case of a plate as 22 which is rigidly fastened in some suitable way to the bed 2 and which is represented as standing at an inclination so as to protect one side of the bearing 4. The other guard member of said latter pair is denoted by 23 and it is fastened in some convenient way to the slide 5. The guard-member 25 has two side flanges as 24 and 25 disposed practically at right angles to each other and both inclined to the horizontal. The flange 25 overlaps the guard-plate 22 and with the latter prevents foreign substances being projected onto the bearing 4 from one side thereof while the flange 24 performs a like office with respect to the other side of said bearing 4. Any grit, oil or the like that may fall onto the flange 24 is directed downward thereby and falls off the lower edge thereof, while should any such materials pass onto the flange 25 they are directed thereby onto the inclined plate 22 and away from the bearing 4. Both bearings therefore are wholly protected against the evil action of solid and liquid matters and can run smoothly with the least amount of friction.

What I claim is:

1. A slide in sections connected together to present a channel, the walls of which are respectively on said sections, said slide having a trough in communication with said channel.

2. A slide in sections connected together to present a channel, the walls of which are respectively on said sections, said slide having a trough below and in communication with the channel, the ends of the trough being closed and the slide having a discharge duct leading from said trough.

3. The combination of a bed and a slide, the former having a bearing for the latter and the slide being formed in sections connected together to present a channel, and a guard-plate for said bearing, fastened to said bed and extending into said channel.
4. The combination of a bed and a slide, the former having a bearing for the latter, the slide having a channel and a trough below the channel, the channel being inclined, a guard plate fastened to the bed and provided with a portion extending into the channel and across the trough, and a guard-member fastened to the slide and having a portion overlapping the first mentioned portion.
5. The combination of a bed and a slide, the former having a bearing for the latter, the slide having an inclined channel and a trough below the channel, a guard-plate fastened to the bed and having an inclined flange extending into said channel and contiguous to the bottom thereof the flange crossing said trough, and a guard-member fastened to the bed having a vertical flange and a crown-flange the latter being at an inclination and overlapping the other flange.

6. The combination of a bed, a slide supported on said bed and having a channel provided with a trough, and a guard fastened to said bed, extending into said channel and entirely across the trough the inner terminal of said guard being contiguous to one wall of said channel.

7. The combination of a bed, a slide supported by said bed and having a channel provided on the lower wall thereof with a trough having closed ends, a guard fastened to said bed, extending into the channel and entirely across the trough the inner terminal of said guard being contiguous to said lower wall, and a discharge duct leading from said trough.

In testimony whereof I affix my signature in presence of two witnesses.

BENGT M. W. HANSON.

Witnesses:
W. M. STORRS,
H. W. KILBOURNE.